United States Patent [19]

Cavada et al.

[11] Patent Number: 4,630,410
[45] Date of Patent: Dec. 23, 1986

[54] REACTOR VESSEL STUD CLEANING MACHINE

[75] Inventors: David R. Cavada, Lower Burrell; Leonard R. Golick, Levelgreen, both of Pa.

[73] Assignee: Westinghouse Electric Corp., Pittsburgh, Pa.

[21] Appl. No.: 558,722

[22] Filed: Dec. 6, 1983

[51] Int. Cl.$^4$ ............................................. B24C 3/18
[52] U.S. Cl. ...................... 51/410; 51/419; 51/415; 51/425; 51/321
[58] Field of Search .............. 51/410, 419, 420, 411, 51/415, 424, 425, 426, 319, 321; 134/144, 153, 109

[56]  References Cited
U.S. PATENT DOCUMENTS

| | | |
|---|---|---|
| 1,476,854 | 12/1923 | Tilley . |
| 1,605,731 | 11/1926 | Hovel . |
| 1,679,369 | 8/1928 | Motz . |
| 2,317,837 | 4/1943 | Webster ............................ 51/415 |
| 2,590,819 | 3/1952 | Huyett ............................. 51/419 |
| 2,629,207 | 2/1953 | Gladfelter et al. . |
| 2,632,980 | 3/1953 | Ransohoff . |
| 2,667,104 | 1/1954 | Gadfelter et al. . |
| 2,669,810 | 2/1954 | Carlson et al. .................... 51/416 |
| 2,692,458 | 10/1954 | Lawrence ......................... 51/420 |
| 2,982,007 | 5/1961 | Fuchs et al. . |
| 3,052,245 | 9/1962 | Nagle ............................... 51/419 |
| 3,103,765 | 9/1963 | Nolan . |
| 3,150,467 | 9/1964 | Umbricht et al. . |
| 3,192,677 | 7/1965 | Johnson et al. . |
| 3,214,867 | 11/1965 | Henning ........................... 51/420 |
| 3,237,351 | 3/1966 | Millhiser . |
| 3,242,618 | 3/1966 | Kosar . |
| 3,455,062 | 7/1969 | Eppler ............................. 51/425 |
| 3,523,391 | 8/1970 | Levinson et al. . |
| 3,626,539 | 12/1971 | Armey . |
| 3,685,208 | 8/1972 | Richter . |
| 3,905,155 | 9/1975 | Smith et al. . |
| 4,219,976 | 9/1980 | Burack et al. . |
| 4,319,435 | 3/1982 | Suzuki et al. . |
| 4,330,968 | 5/1982 | Kobayashi et al. . |
| 4,333,275 | 6/1982 | Bernot . |

FOREIGN PATENT DOCUMENTS

| | | |
|---|---|---|
| 652794 | 12/1964 | Belgium . |
| 0047047 | 3/1982 | European Pat. Off. . |
| 2010890 | 2/1970 | France . |
| 2398573 | 2/1979 | France . |
| 57-033400 | 7/1980 | Japan . |
| 58-196972 | 11/1983 | Japan . |
| 617781 | 2/1949 | United Kingdom . |
| 1410451 | 10/1975 | United Kingdom . |

Primary Examiner—Frederick R. Schmidt
Assistant Examiner—Robert A. Rose
Attorney, Agent, or Firm—Daniel C. Abeles

[57] ABSTRACT

A reactor vessel stud cleaning machine for cleaning reactor studs. The stud is supported horizontally by a pair of roller carriage assemblies inside of a closed chamber. At least one roller carriage assembly has rollers driven by a stud drive motor which cause the stud to rotate. As the stud rotates, a spray nozzle traverses the length of the stud spraying a mixture of high pressure water and abrasive onto the stud. The spent water and abrasive is drained from the enclosure and pumped through a separator funnel and filter bank to remove solids. The filtered water is returned to a supply tank for reuse. The stud rotation speed and spray nozzle traverse speed the variable as in the water pressure and rate of abrasive injection.

25 Claims, 5 Drawing Figures

REACTOR VESSEL STUD CLEANING MACHINE

BACKGROUND OF THE INVENTION

1. Field of the Invention

The present invention relates to an apparatus for cleaning and more particularly to an apparatus for cleaning cylindrical, elongate members such as nuclear reactor vessel studs.

2. Description of the Prior Art

A conventional nuclear reactor vessel is closed on the top by a member known as a reactor vessel head. During operation, the pressure vessel head is secured to the pressure vessel in a pressure tight manner. This is commonly accomplished by the use of a plurality of studs which are spaced about the circumference of a flange formed where the pressure vessel and pressure vessel head are joined.

During refueling and maintenance operations, the reactor pressure vessel head is routinely removed from the pressure vessel. Prior to reassembly, the studs used to join the heads to the vessels are cleaned for ease of reassembly and for non-destructive testing. In addition, a lubricant is used on the studs to facilitate reassembly. After removal, it is desirable that the old lubricant as well as any accumulated dirt and crud be removed so that the stud can be cleanly relubricated prior to its reuse.

To date, no adequate device for cleaning such studs has been developed.

Ransonoff, in U.S. Pat. No. 2,632,980 discloses a method and apparatus for wet grit blasting of a liquid containing suspended grit particles. The liquid is blasted against an article to be cleaned. A centrifugal type pump is used to form a liquid-grit suspension. The suspension is then sprayed from a projector nozzle at workpieces which may continuously advance through the grit blast on a rotating table or be batch tumbled in a rotary mill. Alternatively, the nozzle may be advanced relative to a stationary workpiece.

Nolan, in U.S. Pat. No. 3,103,765 discloses a slurry blasting device wherein the workpiece and the blast gun are manually manipulatable. The device also includes an exhaust system which returns airborne abrasive particles to a slurry hopper for reuse.

Richter, in U.S. Pat. No. 3,685,208 discloses a device for directing a high pressure jet against an advancing array of oscillating workpieces from above and below. A recovery system is employed to recapture the sprayed medium.

Kosar, in U.S. Pat. No. 3,242,618 teaches a method for blasting and flush off with treatment of a large number of small manufactured parts without clamping or the like by tumbling the parts in a perforated drum, thus exposing all surfaces of the parts to processing.

Burack et al., in U.S. Pat. No. 4,219,976 disclose a machine and method for decontaminating a nuclear steam generator channel with an assembly that is adapted to be positioned in the channel head and to sweep a blaster nozzle along an associated track in the head to decontaminate the area in the vicinity of the track.

Umbricht et al, in U.S. Pat. No. 3,150,460 discloses a nozzle structure for blasting grit at the surface of an article to be cleaned.

Other systems for spraying abrasives, some of which teach various recovery systems, are disclosed in U.S. Pat. Nos. 4,333,275; 4,330,968; 4,319,435; 3,455,062; 3,237,351 and 2,667,014.

None of the systems discussed above teach the use of a stud cleaning apparatus wherein the studs cleaned are rotated while a spray nozzle traverses the length of the stud spraying a mixture of high pressure water and abrasive particles at the stud for cleaning and decontamination purposes.

SUMMARY OF THE INVENTION

It is therefore an object of the present invention to provide a method and apparatus for cleaning workpieces such as nuclear reactor pressure vessel studs.

It is a further object of the invention to provide a method and apparatus for cleaning nuclear reactor pressure vessel studs by rotating the studs in a closed chamber while traversing studs longitudinally with a spray of high pressure water and abrasive particles.

It is still a further object of the present invention to provide an apparatus for spray cleaning a rotating stud with a traversing abrasive spray nozzle while the stud rotation rate, the nozzle traverse speed, the length of travel of the spray nozzle, the water pressure, and the rate of abrasive injection are all adjustable.

To achieve the foregoing and other objects and in accordance with the purpose of the present invention, as embodied and broadly described herein, the cleaning device of this invention may comprise roller carriage assemblies for supporting a member such as a reactor stud at ends thereof within an enclosure, at least one of the roller carriage assemblies being operable to rotate the member when driven. A drive means, preferably a dc motor, is connected to one of the roller supporting assemblies for rotating the member supported thereon.

A lead screw is disposed in the enclosure adjacent to the roller carriage assemblies and is operably connected to a second drive means, preferably a second dc motor, to be driven thereby. A spray nozzle is disposed within the enclosure and is operable to spray a cleaning agent against the member. The spray nozzle is driven by the lead screw to traverse the stud which occupies the space between the roller carriage assemblies. Means are also provided for supplying a cleaning agent to the spray nozzle.

Preferably, the cleaning agent comprises a mixture of high pressure water and abrasive grit and the supply means comprises a water supply tank and a high pressure pump connected to an outlet of the water supply tank, the outlet of the high pressure pump being connected to the spray nozzle. A grit tank is also connected to the spray nozzle, the spray nozzle being operable to mix and eject a spray of water and grit.

Preferably, a drain is provided in the enclosure for draining spent cleaning agent from the enclosure. A pump means is connected to the drain for removing the spent cleaning agent and transporting it through a separator and a filter bank for removing any entrained solids. The remaining liquid is returned to the water supply tank for recycling. Preferably, the high pressure pump is variable in response to the cleaning requirements also operable to be shut down in the event the water level in the supply tank decreases below a predetermined minimum to prevent cavitation of the pump.

Preferably, the grit tank has an outlet which comprises a variable restricted flow opening operable to meter the grit being transported to the spray nozzle.

Preferably, both the lead screw drive motor and the stud drive motor are controlled so that the rate of rotation of the stud and the rate of traversal of the stud by the spray nozzle may be tailored to optimally clean the stud without exposing it to unnecessary risk of damage by the abrasive particles.

BRIEF DESCRIPTION OF THE DRAWINGS

The accompanying drawings which are incorporated in and form a part of the specification, illustrate the presently preferred embodiment of the invention and, together with the description, serve to explain the principles of the invention.

DESCRIPTION OF THE PREFERRED EMBODIMENT

Reference will now be made in detail to the presently preferred embodiment of the invention, an example of which is illustrated in the accompanying drawings.

Figure 1:
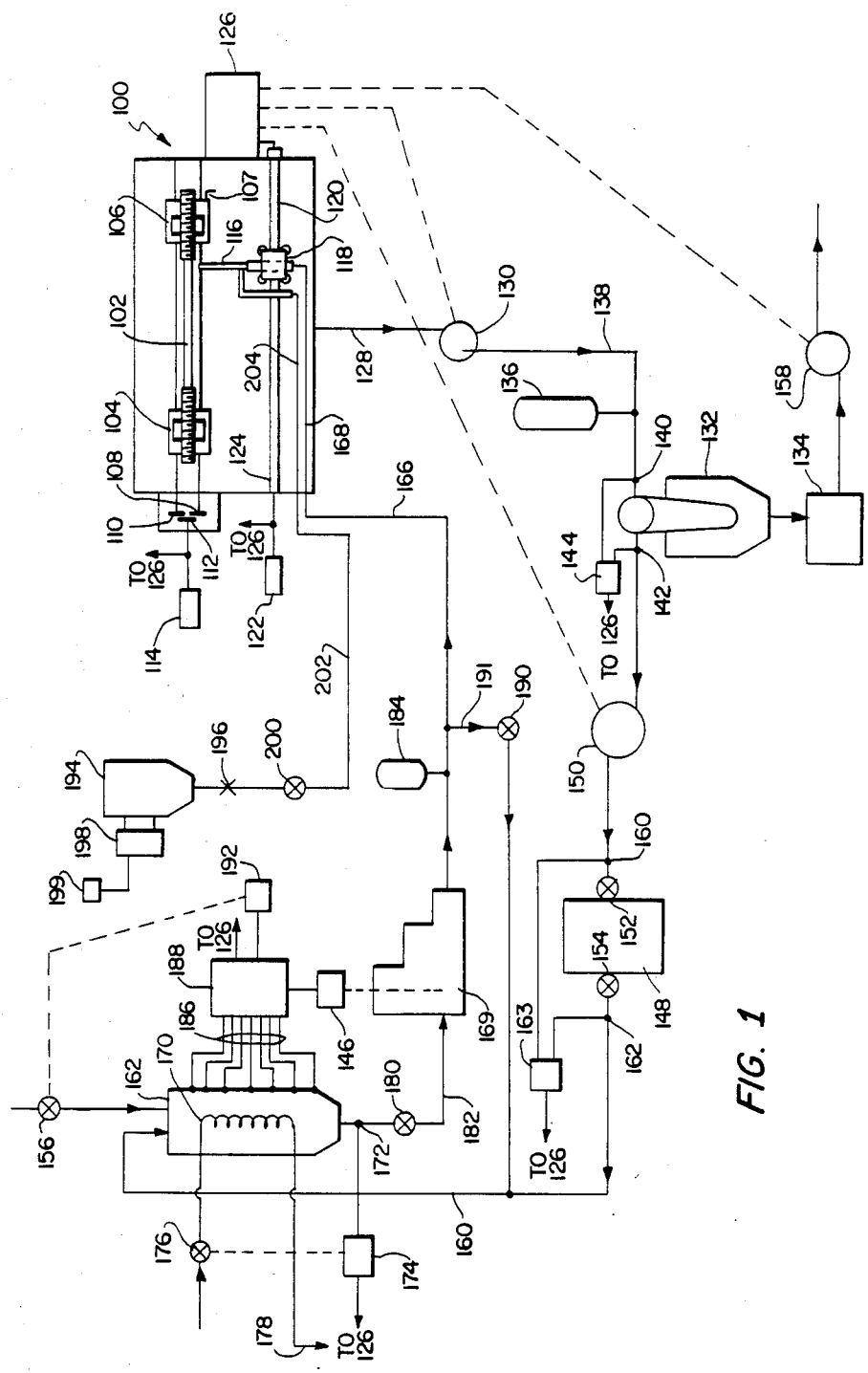
FIG. 1 illustrates a schematic top view of the stud cleaner together with details of the water and grit supply system.

Referring first to FIG. 1, reference 100 denotes a reactor stud cleaner enclosure. A reactor stud 102 is supported in the enclosure on a pair of roller carriage assemblies 104 and 106. Preferably only roller carriage assembly 104 is driven, preferably by means of sprockets 108, 110 and 112, through a stud drive motor 114. The position of roller carriage assembly 106 is preferably adjustable with respect to roller carriage assembly 104 in order to accommodate studs of various lengths. Further details of the roller carriage assemblies are discussed below with respect to FIGS. 3A and 3B.

A spray nozzle 116, for spraying a mixture of high pressure water and abrasive at the stud is carried by a spray nozzle carriage 118. The spray nozzle carriage is engaged by a lead screw 120 which is preferably driven by a lead screw drive motor 122 through a linking member 124. As more fully detailed below with regard to FIGS. 2A and 2B, the rotation of the stud drive and the rotation of the lead screw drive motors are monitored by tachometer rotoducers which provide input signals for control systems which control the stud drive motor 114 and the lead screw drive motor 122. All control systems may be conveniently disposed in a control and monitoring panel 126 attached to the enclosure 100.

The water and grit supply system of the stud cleaner will now be described. The enclosure has a drain 128 which feeds into a low pressure pump 130 such as a diaphragm pump which may be manually operated by means of solenoid valves and air manifolds (not shown) positioned in the control panel 126.

The output of the pump 130 is fed to a separator funnel 132 where any grit, abrasive, or crud entrained in the water stream as a result of the cleaning process is removed to a waste tank 134. It should be appreciated that other liquid-solid separating devices may be substituted for the funnel separator 132 within the scope of the invention. Preferably, the separator 132 is of the type sold by Dorr Oliver Corporation of Stamford, Conn., Model No. 3NZ-3A. A surge suppressor 136 may be positioned in the conduit 138 between the low pressure pump 130 and the separator 132 in order to absorb any pressure surges in that line. Pressure sensors 140 and 142 are preferably positioned on the inlet and outlet sides respectively of the separator 132. The pressure sensors are coupled to a comparator and threshold device 144 to generate an alarm signal if the pressure difference between the inlet and outlet of the separator funnel 132 exceeds a predetermined maximum indicative of a clog or blockage. The output of the comparator/threshold device 144 may conveniently be connected to the control panel 126 where an appropriate gauge and/or enunciator (not shown) is positioned. The signal from the comparator/threshold circuit 144 may also be used as an automatic shutdown signal to deenergize the stud drive motor 114, the lead screw driver motor 122 as well as a motor 146 for the high pressure pump 169. The operation of the high pressure pump motor 146 is further explained below.

The outlet of the funnel separator 132 is fed to a filter bank 148 through a second low pressure pump 150. The pump 150 may also comprise a diaphragm pump control from the control panel 126 by means of conventional solenoid valves and air manifolds (not shown). Filter bank 148 preferably comprises a dual filter bank of the type marketed by Dover Corporation of Portage, Mich., Model No. CST-224DUO-SE having 2 three-way ball valves or the like 152 and 154. As will be apparent, with the use of a dual filter bank, one bank of filters can be connected in-line while the second bank is having the filter basket replaced or cleaned. The ball valves 152 and 154 can be manually operated for that purpose.

A third low pressure pump 158 is used to drain the waste tank 134 to a conventional hittman cask (not shown) or the like where any radioactive residue from the stud cleaning operation can be safely stored.

Preferably, pressure sensors 160 and 162 are positioned at the inlet and outlet side respectively of the filter bank 148 and connected to a second comparator-threshold detector 163 which generates a signal if the pressure differential across the filter bank gets excessively high indicating a clog, blockage, or the like. A signal from the comparator-threshold detector 163 is preferably fed to the control panel 126 to energize an indicator and/or enunciator (not shown) on the control panel 126 and may also be used to control the motors 114, 122, and 146 in the manner described above with respect to the funnel separator 132.

After passing through the filter bank 148, the fluid stream passes through a conduit 160 and into a water supply tank 162. Fluid is pumped from the water supply tank 162 by means of high pressure pump 169 driven by the pump motor 146. The pump outlet is fed to the spray nozzle 116 through a supply line 166 which includes a flexible portion 168 adapted to follow the movement of the spray nozzle 116.

The supply tank 162 is preferably provided with a cooler 170 which may be in the form of a cooling coil in order to reduce the temperature of the water before it passes through the high pressure pump 169 where it will undergo a considerable rise in temperature due to the pumping action. The cooler 170 is preferably controlled by a temperature sensor 172 which is connected to a valve control device 174 such as a solenoid valve which controls the flow through the cooling coil 170. The outflow from the cooling coil may be channeled to a drain through the conduit 178. The cooling medium in the coil 170 may simply comprise available tap water.

A manual ball valve 180 or the like may be provided on the outlet of the supply tank 162 in order to open, close or control the maximum flow through the conduit 182 which connects the water supply tank 162 to the high pressure pump 169.

Preferably, a pulse dampener 184 or the like is provided in the line 166 in order to dampen out any pressure pulses which may occur in the outflow of the high pressure pump 169. This is desirable in order to ensure that the flow of high pressure water to the nozzle 116 is of relatively constant, controllable pressure since an excessive pressure surge may result in damage to the stud member.

A plurality of level sensors 186 are preferably provided in the supply tank 162. Sensors 186 are connected to a level indicator 188. If the level of fluid in the tank 162 becomes too low, make-up water is provided by means of a solenoid valve 156 and valve controller 192 respectively, in order to increase the level of water in the tank 162. If the level of fluid in the supply tank 162 falls below a dangerously low level, the pump 169 is shut down to prevent pump operation under cavitation conditions. The fluid level indicator 188 may also be connected to an indicator and/or enunciator (not shown) on the control panel 126. A relief valve 190 may also be provided for system over-pressure protection and for flow bypass from the output of pump 169 back to the supply tank 162.

As will be apparent to the artisan, the output of the pump 169 may also be controlled in order to regulate the water flow to the spray nozzle 116 in accordance with the cleaning requirements.

For example, the threaded portions of a stud are known to be more difficult to clean than smooth portions. Therefore, as the spray nozzle traverses the threaded portions of the stud, the pump pressure may be increased to enhance the abrasive action of the cleaning agent. This can be accomplished manually by the operator or can be accomplished automatically in connection with the control system for the lead screw drive motor 122 illustrated in FIG. 2B and discussed below.

A grit pot 194, preferably equipped with a variable restricted orifice outlet 196, is provided for holding the abrasive material. The vibrator 198, preferably of the electromechanical variety, such as that marketed by FMC Corporation of Homer City, Pa., Model No. V-20 is attached to the grit pot to maintain a flow of grit through the restricted orifice 196. The vibrator may be controlled by a vibrator control 199 such as that marketed by FMC Corporation of Homer City, Pa., Model No. SCR-1B. The size of the orifice 196 may be manually or automatically set to create a grit/water mixture of the proper proportions. It should be understood, that the orifice 196 operates as a metering orifice for the grit. A manually operated ball valve 200 may also be provided downstream of the orifice in order to control flow through the channel 202. The conduit 202 terminates at a flexible portion 204 which is connected to the spray nozzle 116 in order that the conduit 204 can follow the movement of the nozzle 116 in the same manner as the high pressure water supply conduit 168 discussed above.

As should now be apparent, the invention described above may be used to safely clean stud type members, even those carrying radioactive dirt and grit. The stud 102 is first placed horizontally on roller carriage assemblies 109 and 106 inside the closed chamber 100. While a horizontal stud carrying configuration is preferred, it should be apparent that it is within the scope of the present invention for the studs to be held in a vertical orientation during cleaning. The stud drive motor 114 is then energized causing the stud 102 to rotate. While the stud rotates, the spray nozzle 116 traverses the length of the stud while spraying a mixture of high pressure water and abrasive onto the stud. The spent water/abrasive mixture is drained to the bottom of the enclosure 100 and pumped by means of the pump 130 into the separator funnel 132 which removes any large solid particles. The remaining liquid is then pumped through the filter bank 148 to remove smaller particles, on the order of 2-3 microns in size. The filtered water is then returned to the supply tank 162 for reuse. Solids, which may be radioactive, are pumped by means of pump 158 from the waste collection tank 134 to a hittman cask and prepared for disposal in a conventional manner. Because of the topography of the stud and the cleaning requirements thereof, the stud rotation speed and spray nozzle traverse speed are variable. In addition, in order to accommodate studs of various length, the length of travel of the spray nozzle and the distance between the roller carriage assemblies is variable.

By controlling the operation of the relief valve 190 and the orifice 196 respectively, the water pressure and rate of abrasive injection are both adjustable so that specific stud and stud portion cleaning requirements can be met while avoiding damage to stud material.

Figure 2A:
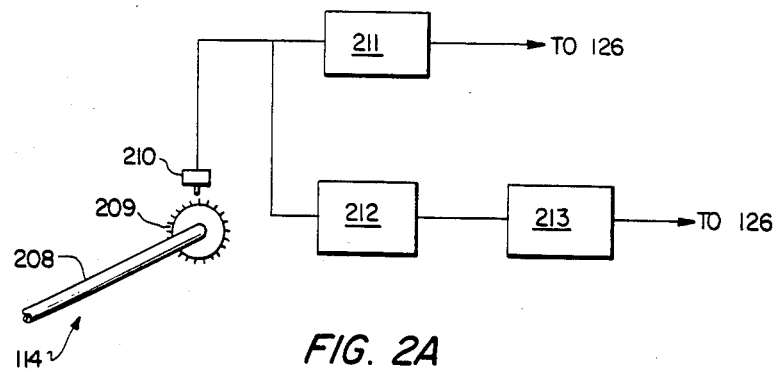
FIGS. 2A and 2B are block diagrams illustrating the control systems for the lead screw drive motor and the stud drive motor respectively.
Figure 2B:
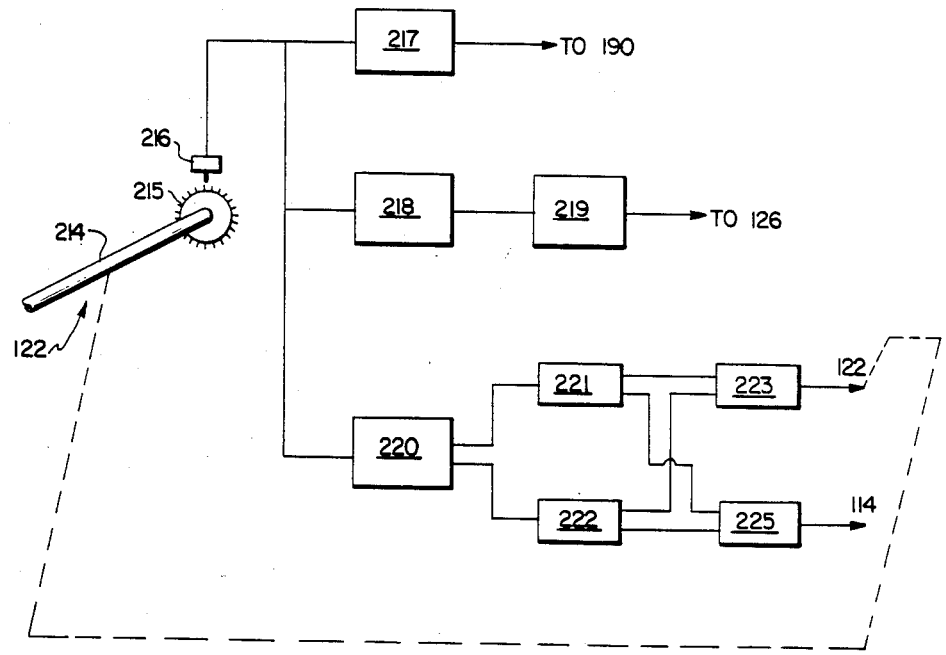

Turning now to FIGS. 2A and 2B there are depicted control systems for the stud drive motor 114 and the lead screw drive motor 122 respectively. In FIG. 2A, the numeral 208 depicts an output shaft of the drive motor 114 or of the gear reducer 244. Preferably, the drive motor 114 is a quarter horsepower dc motor, operable to drive rollers 234 (FIG. 3A) via a gear reducer 244 and a chain and sprocket drive assembly. Alternatively, the stud drive motor may be a dc servo-motor directly connected to the drive rollers 234 without the need for any intervening gear reducer. The servo-motor drive is particularly advantageous where a microprocessor control is utilized.

A tach-rotoducer having teeth elements 209 and detector 210 is positioned on a shaft 208 and operable to generate a signal indicative of the rotation of the shaft 208. This signal is inputted into a speed switch 211 which is operable, in the event that rotational speed of the shaft 208 decreases below a predetermined minimum, to shut down the motor 146 of the high pressure pump 164, thus preventing damage to the stud 102 in the event that the stud rotation drive becomes damaged or for some reason ceases to rotate at an adequate speed. In addition to shutting down the pump motor 146, it should be appreciated that the pump output can be controlled by means of a controllable, variable drive system, such as a pulley drive system, or by controlling the amount of water bypassed through the line 191 back to the supply tank 162 by controlling the relief valve 190. The output of the detector 210 is also fed to an output calibration device 212 which is connected to a tachometer 213 in order to provide an indication of the rotational speed of the stud drive. The tachometer is equipped with a conventional indicator preferably positioned on the control panel 126.

Turning to FIG. 2B, there is depicted a control system for the lead screw drive assembly. The rotation of a shaft 114 is detected preferably by a tachrotoducer comprising a toothed wheel 215 and a detector 216. In a manner similar to that described above with regard to FIG. 2A, the output of the detector 216 is fed to a speed switch which is operable to shut down the high pressure pump motor 146 in the event that the rotational speed of the lead screw falls below a predetermined minimum. As before, the pump output can also be controlled by means of a controllable, variable drive system such as a variable pulley drive or by controlling the amount of water bypassed through the line 191 back to the supply tank 162 by controlling the relief valve 190. In addition, the output of the detector 216 is fed to an input calibrator 218 and then to a tachometer 219 whose output is indicated by a dial, digital counter or the like, preferably positioned on the control panel 126.

In addition, the output of the detector 216 is fed to a preset counter 220 which may be of the type marketed by Electrical Counters and Controls Corporation of Mundelein, Ill., Model No. SBL 135 which is operable to count the rotations of the shaft 214 in order to determine the position of the spray nozzle 116 relative to the stud 102. The preset counter 220 is preprogrammed with information regarding the length of the stud, and the topography of the stud such as the position of the portions of the stud which are threaded, the portions which are smooth, etc. As alluded to above, when for example the spray nozzle is traversing a portion of the stud which is threaded, it is desirable to slow down the rate of traversal of the spray nozzle and the rate of rotation of the stud in order to ensure that the threaded area is properly cleaned. On the other hand, when the spray nozzle is traversing a smooth area of the stud, the rate of traversal of the spray nozzle and the rate of rotation of the stud may be increased while still achieving adequate results in terms of cleaning. Accordingly, high speed circuit 221 and low speed circuit 222 are provided which are activated by the preset counter 220 in accordance with the position of the spray nozzle 116 as determined by the preset counter 220. The high and low speed circuits 221 and 222 are operable to control the lead screw drive motor 122 through servomotor controller 223 in order to adjust the speed of traversal of the nozzle 116 in accordance with the requirements of the portion of the stud being traversed. In a similar manner, the outputs of the high and low speed circuits 221 and 222 respectively are fed to an SCR control device 225 in order to control the speed of rotation of the dc motor 114. It should be appreciated by the artisan that if a servomotor is substituted for the dc motor 114, a servomotor control will be substituted for the SCR control 225.

While the embodiment illustrated and described above relates to a simple two speed control of the lead screw and stud drive motors, it should be appreciated that any number of speeds can be used to precisely control the stud drive and lead screw drive, either jointly or independent of each other, in order to achieve optimum cleaning results and minimal damage or erosion to the stud. In fact, it is within the scope of the present invention for the drive motors to be continuously controlled as a function of position of the spray nozzle 116.

Figure 3A:
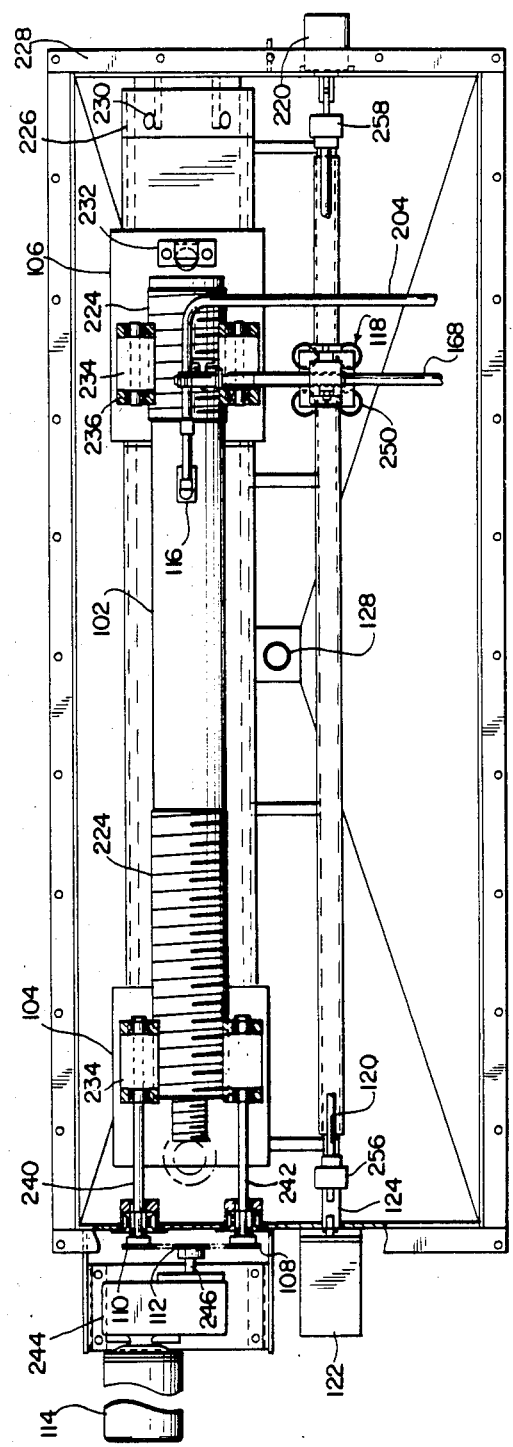
FIGS. 3A and 3B are top and plane views respectively of the interior of the stud cleaning device enclosure.
Figure 3B:
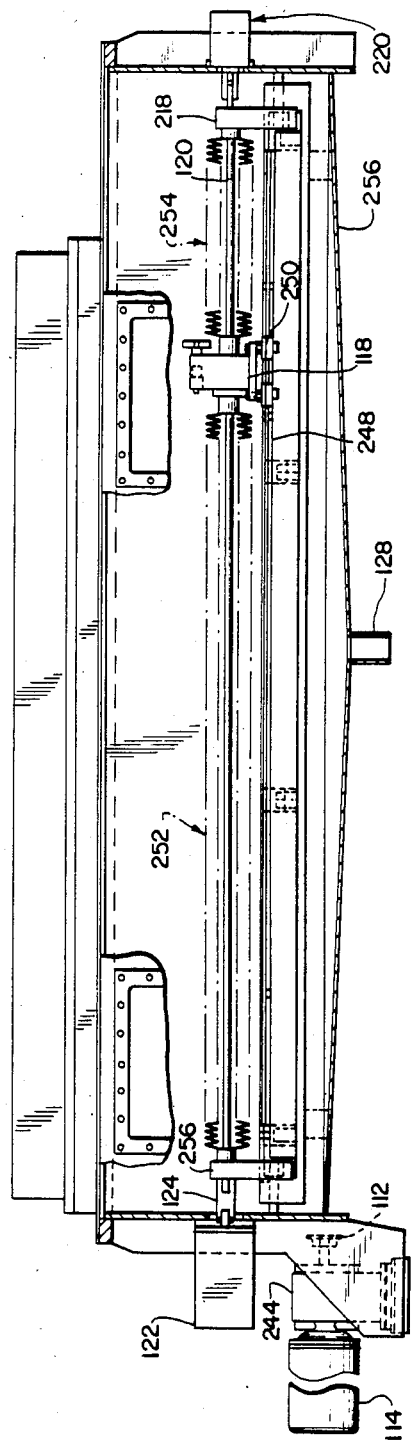

Turning now to FIGS. 3A and 3B there are illustrated top and side views respectively of the inside of the cleaning compartment 100 of a stud drive cleaner according to the present invention. Elements similar to those illustrated in FIGS. 1 and 2A and 2B are similarly numbered in FIGS. 3A and 3B. As best seen in FIG. 3A, a typical reactor stud 102 has threaded portions 224 and unthreaded portions, each of which have different cleaning requirements. The roller carriage assembly 106 is movable with respect to the roller carriage 104 and may be repositioned on the channel 226 by means of a locking key or the like in order to accommodate studs of various lengths. The channel 226 is rigidly secured to the frame 228 of the enclosure 100 by fasteners 230 which may comprise screws or the like. The carriage 106 is provided with a stop roller 232 to prevent the stud from moving to the right as it is rotated.

Each of the roller carriage assemblies has a pair of rollers 234 which are preferably supported on bearings 236 to ensure ease of rotation.

The spray nozzle position is adjustable by means of a ball and nut assembly 238 or the like so that the spray nozzle 116 may be properly positioned with respect to the stud.

The rollers 234 on the roller carriage 104 are driven through shafts 240 and 242 which have at their ends sprockets 110 and 108 respectively. The shafts are driven by the motor 114 through a gear reducer 244 whose output shaft 246 carries the sprocket 112. A chain 248 or the like may be used to drive the sprockets 108 and 110 from the driven sprocket 112. As alluded to above, the gear reducer 244 may be eliminated if a dc servomotor is substituted for the motor 114. It should also be appreciated that other stud drive means may be substituted for the sprocket and chain drive illustrated within the scope of the present invention.

The spray nozzle carriage 118 preferably rides on a "way" or track 248 by means of engagement rollers 250 which seat in a groove in the track 248. The lead screw 120 is preferably protected against damage from grit or the like by bellows 252 and 254. The lead screw is journalled between support members 256 and 258. Each of the bellows 252 and 254 are preferably operable to extend between the spray nozzle carriage 118 and a support member 256 or 258 so that as the carriage 118 traverses the stud, the bellows 252 and 254 expand and contract in a complementary manner. Thereby, the progress of the carriage 118 is not impeded and the lead screw 120 is always covered in order to protect it against grit and abrasives.

The bottom 256 of the enclosure 100 is configured so that the water and grit from the spray nozzle 116 will collect at the drain 128 for recycling back to the supply tank 162.

The foregoing description of a preferred embodiment of the invention has been presented for purposes of illustration and description. It is not intended to be exhaustive or to limit the invention to the precise forms disclosed, and obviously many modifications and variations are possible in light of the above teaching. The embodiment was chosen and described in order to best explain the principles of the invention in its practical application to thereby enable others skilled in the art to best utilize the invention in various embodiments and with various modifications as are suited to the particular use contemplated. It is intended that the scope of the invention be defined by the claims appended hereto.

We claim:

1. A device for cleaning and decontaminating an elongate member having a three dimensional surface topography comprising:
    an enclosure;
    means for rotatingly supporting said elongate member proximate the ends thereof within said enclosure;
    means for driving said elongate member supporting means, to rotate said elongate member; a supply tank for holding water a spray nozzle connected to said supply tank and disposed within said enclosure operable to move transversely with respect to said elongate member for spraying a cleaning agent comprising high pressure water and abrasive grit against the rotating elongate member;

a self-contained means for supplying said cleaning agent to the spray nozzle and removing spent cleaning agent from the enclosure, said self-contained means including said supply tank and means for disposing of any contaminated solids in the spent cleaning agent, said means for disposing further comprising means for removing spent cleaning agent from said enclosure, means for removing solid particles from said spent cleaning agent and means for recycling water from said spent cleaning agent back to said spray nozzle; and a control system for selectively controlling at least one of the rate of rotation of said elongate member and rate of traversal of said elongate member by said spray nozzle in accordance with the topography of said elongate member.

2. The cleaning device of claim 1 wherein said self-contained means further comprises:

a high pressure pump connected to an outlet of said supply tank, an outlet of said high pressure pump being connected to said spray nozzle;

a grit tank for holding grit connected to said spray nozzle; said spray nozzle being operable to mix and eject a spray of said water and grit;

a drain positioned in said enclosure for draining spent cleaning agent and wherein said means for removing said spent cleaning agent from said enclosure comprises a pump connected to said drain, and said means for removing solid particles from said spent cleaning agent comprises a separator connected to said pump, and said means for recycling water comprises an outlet of said separator which is connected to an inlet of said supply tank to recycle the water from the spent cleaning agent thereto.

3. The cleaning device of claim 1 further including a shaft associated with said means for driving the elongate member and wherein said control system comprises a rotational speed detector associated with said means for driving said elongate member and means operable to limit the supply of said cleaning agent to said spray nozzle whenever the speed of rotation of said shaft falls below a predetermined minimum speed.

4. The cleaning device of claim 2 wherein said separator comprises:

a funnel separator; and a filter bank, connected between said funnel separator and said supply tank for removing any fine particles passing through said funnel separator.

5. The cleaning device of claim 4, further comprising means for monitoring a pressure drop across said funnel separator and providing a signal when said pressure drop exceeds a predetermined value.

6. The cleaning device of claim 4, further comprising means for monitoring a pressure drop across said filter bank and providing a signal when said pressure drop exceeds a predetermined value.

7. The cleaning device of claim 2 further comprising:

a cooling means disposed in said supply tank for cooling said water;

a temperature sensor for measuring the temperature of said water;

means for controlling said cooling means in response to the measured temperature.

8. The cleaning device of claim 2 further comprising a level detector for detecting a water level in said supply tank and generating a low level signal if said level decreases below a predetermined minimum.

9. The cleaning device of claim 8 further including means for controlling said high pressure pump in response to said water level to prevent cavitation of said pump.

10. The cleaning device of claim 2 further including a bypass passage connecting said high pressure pump output to said supply tank input, said bypass passage having a valve therein for controlling flow through said bypass passage according to high pressure pump output requirements.

11. The cleaning device of claim 8 further including a make-up water supply line connected to supply tank, said supply line having a valve therein responsive to said level detector for controlling flow in accordance with said low level signal.

12. The cleaning device of claim 2 further including a pulse dampener connected between the outlet of the high pressure pump and the spray nozzle to absorb any pressure pulsations from said high pressure pump.

13. The cleaning device of claim 2 further comprising a vibrator connected to said grit tank for causing grit to flow through a grit tank outlet.

14. The cleaning device of claim 13 wherein said grit tank outlet comprises a variable, restricted flow opening for metering said grit.

15. A device for cleaning an elongate member comprising:

means for supporting said member at ends thereof within an enclosure, said supporting means being operable to rotate said member when driven;

a first drive means operably connected to said supporting means for driving same;

a lead screw, disposed adjacent said supporting means in said enclosure;

a second drive means operatively connected to said lead screw for driving same;

a spray nozzle disposed within said enclosure and operable to spray a cleaning agent against said member;

said spray nozzle being driven by said lead screw to traverse a space adjacent said supporting means;

means for supplying said cleaning agent to said spray nozzle;

a control system for controlling the second drive means comprising:

a shaft associated with the second drive means;
means for detecting the rotation of said shaft;
a programmable counter connected to said detecting means and operable to generate a speed signal whose value varies as a function of the rotation of said shaft;
a drive means control, connected to said programmable counter and operable to control said second drive means in accordance with said speed signal whereby said lead screw is caused to rotate at a speed dependent upon the number of rotations of said shaft.

16. The cleaning device of claim 15 further including an output calibrator and tachometer connected to said detecting means for providing a rotational speed indication signal.

17. The cleaning device of claim 15 further comprising a speed switch connected to said detecting means and operable to limit the supply of cleaning agent to the spray nozzle whenever said shaft rotates as a speed below a predetermined minimum speed.

18. The cleaning device of claim 15 wherein said speed signal comprises a high speed signal and a low speed signal and said control system further comprises high and low speed signal circuits for controlling said drive means control.

19. The cleaning device of claim 15 further including means for controlling said first drive means, said means for controlling the first drive means being connected to said programmable counter and operable to control the rate of rotation of said first drive means in accordance with the number of rotations of the shaft associated with said second drive means.

20. The cleaning device of claim 1, wherein said elongate member supporting means further comprises:
first and second roller carriage assemblies spaced from each other within said enclosure;
said first roller carriage assembly comprising a pair of support rollers adapted to be driven by said first drive means.

21. The cleaning device of claim 20, wherein said pair of support rollers have shafts extending from said enclosure, said shafts being driven by said means for driving said elongate member.

22. The cleaning device of claim 20, wherein said second roller carriage assembly is movable with respect to said first roller carriage assembly for accommodating elongate members of various lengths.

23. The cleaning device of claim 22, wherein said second roller carriage assembly further comprises a stop means for preventing axial translation of said elongate member when the support rollers of said first roller carriage assembly are driven.

24. The cleaning device of claim 1 further comprising a lead screw disposed adjacent said elongate member supporting means and within said enclosure and wherein said spray nozzle is carried by a spray nozzle carriage which engages said lead screw, said lead screw being enclosed on either side of said spray nozzle by a generally coaxial bellows means which is operable to expand and contract in accordance with the movement of said spray nozzle carriage.

25. The cleaning device of claim 24 further including a track disposed adjacent to said lead screw, said spray nozzle carriage having means for rollingly engaging said track whereby said nozzle carriage is maintained in a stable upright position as said track is traversed.

* * * * *